United States Patent [19]

Mozer et al.

[11] Patent Number: 5,022,071
[45] Date of Patent: Jun. 4, 1991

[54] TWO-WAY VOICE & DIGITAL DATA ANALYZER FOR TELEPHONES

[75] Inventors: Forrest S. Mozer, Berkeley; Shiu L. F. Chan, Los Alto Hills, both of Calif.

[73] Assignee: Electronic Speech Systems, Hayward, Calif.

[21] Appl. No.: 292,584

[22] Filed: Dec. 30, 1988

Related U.S. Application Data

[63] Continuation-in-part of Ser. No. 111,243, Oct. 21, 1987, abandoned.

[51] Int. Cl.⁵ .......................................... H04M 11/00
[52] U.S. Cl. ........................................ 379/93; 379/74; 379/80; 379/97; 379/100; 379/102
[58] Field of Search ...................... 379/80, 88, 95–98, 379/100, 102, 104, 105, 93, 74

[56] References Cited

U.S. PATENT DOCUMENTS

| | | | |
|---|---|---|---|
| 3,873,772 | 3/1975 | Dumler | 379/80 |
| 3,989,901 | 11/1976 | Neuwirth et al. | 379/80 |
| 4,356,348 | 10/1982 | Smith | 379/34 |
| 4,800,439 | 1/1989 | Yoshino | 379/100 |
| 4,821,312 | 4/1989 | Horton et al. | 379/97 |
| 4,837,797 | 6/1989 | Freeny, Jr. | 379/96 |
| 4,901,343 | 2/1990 | Yamaguchi | 379/100 |

FOREIGN PATENT DOCUMENTS

| | | | |
|---|---|---|---|
| 0063262 | 3/1988 | Japan | 379/100 |
| 0065753 | 3/1988 | Japan | 379/100 |
| 0007802 | 12/1987 | World Int. Prop. O. | 379/100 |

Primary Examiner—Jin F. Ng
Assistant Examiner—Wing F. Chan
Attorney, Agent, or Firm—Townsend and Townsend

[57] ABSTRACT

A method and apparatus is disclosed which allows the sending or receiving of either speech or digital data calls over a phone line by correctly connecting either a digital data machine or a voice phone with the line without any human involvement. An analyzer connected to the phone line interrogates each incoming call to determine if it is a voice call or a digital data call. If it is a voice call, the analyzer rings the phone and connects it to the line when the phone is answered. If the incoming call is a digital data call, the data machine, e.g., fax, is connected to the phone line. The distinction between voice and digital data calls is based in part on analyses of incoming response to an interrogation of the caller with messages from a speech synthesizer. For outgoing calls, the analyzer determines which of the phone and the data machines becomes active, and connects the active one with the phone line while it blocks access to the line by the other one until the outgoing call is complete. A line manager is employed for voice phones connected to the line upstream of the analyzer so that it too is connected or disconnected from the line during the appropriate times.

20 Claims, 14 Drawing Sheets

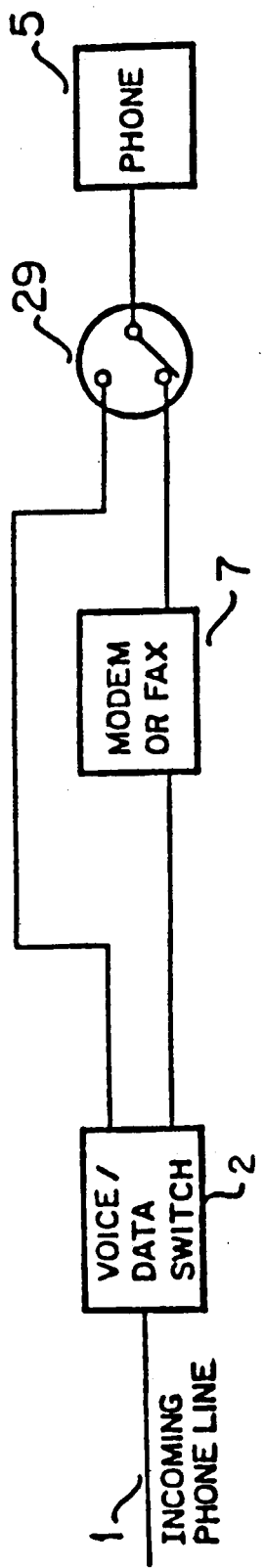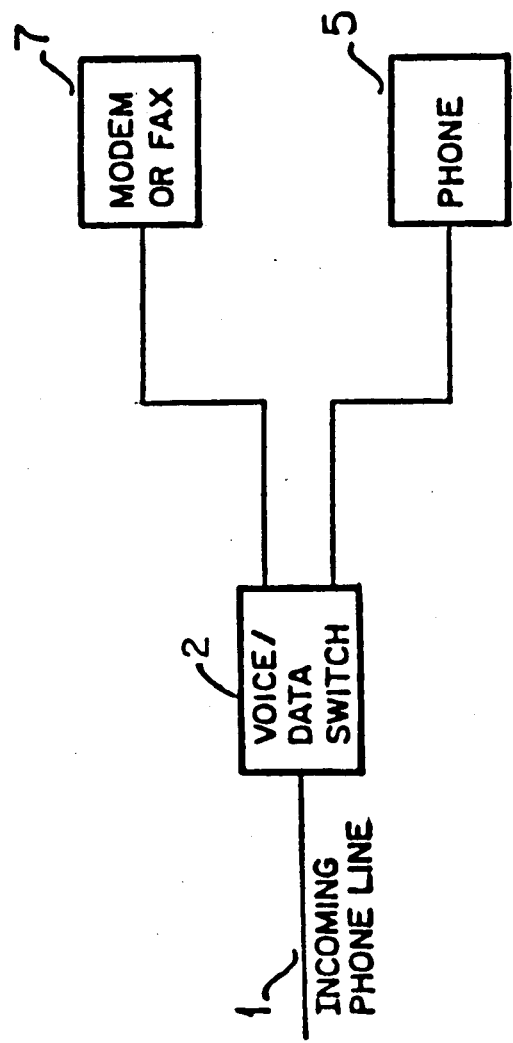
FIG. 4a
FIG. 4b

TWO-WAY VOICE & DIGITAL DATA ANALYZER FOR TELEPHONES

RELATED APPLICATION

This application is a continuation-in-part application Ser. No. 07/111,243, filed Oct. 21, 1987, now abandoned.

FIELD OF THE INVENTION

The present invention relates to the automatic transmission or reception of either digital data or voice data on a single phone line. The appropriate local apparatus, such as a phone, or a modem, facsimile ("fax") machine, etc. (hereafter collectively usually referred to as "data machine") is connected to the incoming call without human involvement at the receiving end of the call, and makes an outgoing call without human involvement by the caller other than that associated with the normal placement of a call.

BACKGROUND OF THE INVENTION

With the advent of personal computers, there has been an increasing requirement for the transmission of digital data from one locale to another. This requirement will continue to grow as large data bases are accessed by more people electronic checking becomes more wide-spread, electronic purchasing becomes more popular, etc. Similarly, there is a revolution in the facsimile ("fax") transmission field in which fax machines are becoming as common as computers in homes and small offices, and people will transmit papers to each other as regularly as they now make phone calls. All of these applications utilize phone lines for digital data transmission. In single phone line facilities, such as homes or small offices, this creates a problem since the line must be connected to the local data machine if one is expecting to receive or send a digital data message. This makes the phone unavailable for outgoing or incoming voice messages, i.e., conventional telephone calls.

The problem may be solved by installing a separate phone line for each data machine. However, this solution is very costly. Another solution is to require that a human at the sending or receiving end of a phone call make the decision and appropriately connect the local electronics, which is very inconvenient. Therefore, what is needed is an electronic device connected to the local phone line, which determines the nature of each incoming or outgoing phone call (voice call or digital data call) without the need of human assistance and which connects the phone line to the appropriate local equipment after the determination is made. Such a device, if reliable and inexpensive, can pay for itself in a few months because of its convenience and the elimination of the need for multiple phone lines and/or a human operator to route the call.

The above is just one example of the use of a signal analyzing and receiver (or sender) switching device, hereinafter sometimes in abbreviated form referred to as a "voice/data switch", that recognizes the nature of incoming or outgoing calls and that connects the phone line with the appropriate apparatus after determining the nature of each such call without requiring human assistance. The prior art has not been able to satisfactorily fill the need for such a voice/data switch because in the past such devices have not been reliable, have been expensive, have required human assistance, and have not operated on outgoing calls.

Although it may appear simple to distinguish between digital and voice calls, and to connect them to the appropriate equipment, in the past the task has been difficult to handle without human intervention because data machines, such as modems, for example, have widely differing characteristics. Depending on the brand of the modem, it may address the receiving modem with a single, constant pitch tone, a series of digital signals, or silence, to name a few. It becomes particularly difficult to interpret with a machine the meaning of silence; it could be a sending modem awaiting the connection to the data receiver or a human speaker awaiting a spoken response. A machine capable of distinguishing between digital and voice messages only cannot handle such a situation. Moreover, in the past machines of this type were limited to processing one type of call, i.e., either receiving or outgoing calls. The complexity of handling both types of calls and reliably, quickly or transparently analyzing the calls, whether they are digital or voice calls, and doing so without any human intervention, was not solved. The present invention is capable of doing this in an effective, efficient and relatively inexpensive manner.

SUMMARY OF THE INVENTION

The invention, hereinafter to be described in greater detail, provides an apparatus for independently, inexpensively, and reliably distinguishing whether incoming or outgoing calls are voice or digital data calls, and for efficiently handling and routing either type of call.

It is therefore an object of the present invention to provide a means for reliably distinguishing between incoming or outgoing voice and digital data calls without human involvement beyond that normally associated with placing or receiving a call, i.e., dialing a number or answering a voice call.

It is a further object of the present invention to provide a means of connecting the phone line to the appropriate local apparatus, depending on whether the incoming or outgoing call is a voice or digital data call.

It is yet a further object of the present invention to monitor the local phone line and local equipment and to achieve the above results in a manner that is transparent to the local phone user.

It is another object of the present invention to design an inexpensive and reliable apparatus for achieving the above results.

Broadly, these and other objects of the present invention are achieved by providing a voice/digital data switch which routes incoming calls to the appropriate local receiver and which connects the appropriate local equipment to the phone line on outgoing calls. On incoming calls, it is capable of handling all types of data senders, including those which do not send an initial identifying signal, by continuously monitoring the incoming call for digital data signals. If no such signals are found, e.g. because none are initially sent, the switch prompts the caller to speak. If the call is a voice call, the caller will respond, thereby enabling the switch to determine that the call should be routed to the local voice phone. If the prompt does not result in a spoken response, e.g. if silence is maintained, the switch interprets it as being a digital data message and connects the call to the local data machine.

Thus, the present invention makes it possible to distinguish between incoming voice and digital data calls and route them to the appropriate receiver. It does so without human intervention, i.e. automatically, because it is capable of not only distinguishing between digital and voice calls, but because it can also establish when silence on the incoming line results from a sending data machine awaiting a connection to a local data machine, as distinguished from silence resulting from a human speaker awaiting the spoken response of a person at a receiving voice phone.

To handle outgoing calls, the voice/data switch monitors whether the local phone or data machine goes off-hook. It connects the one that is off-hook to the local phone line while it prevents the other one from accessing the line so long as the first one is off-hook. It disconnects the equipment when it later goes on-hook and awaits the next incoming or outgoing call.

The voice/data switch of the present invention is connected to the incoming phone line, the local voice phone and the local data machine and performs additional necessary and helpful tasks which greatly enhance its utility and make it operate much in the same fashion as a human operator would. Thus, the switch monitors the incoming line and determines when a call is received or terminated, the local voice phone is on or off-hook, or the data machine is on or off-hook. From this data, it determines whether the call is incoming or outgoing, and, if outgoing, whether it is a voice or data call.

It further determines whether the incoming call is a voice or digital data call by prompting the caller with speech from a speech synthesizer and searching for periodicity in the incoming signals which, if present, indicates that it is a digital call, in which event the incoming call is connected to the data machine. If a modem or fax tone, i.e. periodicity, is not found, either because no signals are received or the signals are non-periodic, e.g. are voice signals, the switch rings the local phone and the incoming call is connected to it while shielding the caller from the local ring.

If, after a predetermined time interval on an incoming call, the local voice phone is not picked up, the speech synthesizer of the switch is activated to advise the caller that there is no one to answer the call and to provide such further messages as might be desired or appropriate. When the local phone is taken off-hook and the phone line is busy with either an incoming or outgoing data call, a message is synthesized by the voice/data switch and fed to the local phone informing the person that the line is in use.

The voice/data switch of the present invention can include additional prompts, time delays and analysis to further determine the nature of the incoming call and, for example, provide the caller with time to connect the data machine after the initial prompt while analyzing the signals once they are received to make certain that they are in fact digital signals. Further, the switch is constructed so that it returns to its standby state whenever a call is terminated or the local phone or data machine is hung up before, during or following a conversation or data transmission. All these activities take place in a matter of a few seconds without human intervention.

Although speech synthesis forms an integral part of the present invention and makes it possible to automatically operate in the above-summarized manner, speech synthesis per se is not part of it. The manner in which speech is synthesized is now well known in the art.

Time domain synthesized speech is particularly well suited for use with the switch of the present invention. An especially advantageous time domain speech synthesizer is disclosed and claimed in U.S. Pat. No. 4,384,170, owned by the assignee of the present application and incorporated herein by reference. It is a simple, efficient and effective speech synthesizer which, in one of the preferred embodiments of the present invention, is incorporated in the above-described voice/data switch.

Briefly, such a speech synthesizer has a memory in which speech information signals and speech reconstruction signals are stored. The information signals are obtained by initially digitizing the analog speech waveforms and discarding up to 80% or more of the digital signals while retaining only the most significant ones, thereby "compressing" the speech in accordance with one or more compression techniques so that relatively little memory space is required for storing the signals.

Also stored in the memory are instruction signals which, during the later reconstruction or synthesis of the speech, are used to expand the stored information signals. The instruction signals contain information on how the stored speech signals were compressed and they are utilized by an intermediate digital processor to assure that the speech signals are properly expanded in accordance with the initially employed compression technique or techniques. As a result, the synthesized speech will closely approximate the original speech and will sound virtually the same.

The expanded digital, synthesized speech signals are then converted into analog signals and, at the appropriate times, the analog signals are sent out by the switch of the present invention to prompt the caller into action and/or to relay desired messages to him.

Other aspects of time domain speech synthesis which can be usefully employed in the speech synthesizer of the voice/data switch of the present invention are disclosed and claimed in U.S. Pat. Nos. 4,214,125; 4,384,169; 4,435,831; and 4,458,110. Substantial portions of these patents disclose in detail the manner in which speech is advantageously synthesized to minimize the storage (memory) capacity required therefor and provide high quality synthesized speech. Accordingly, the disclosures of these U.S. patents are also incorporated herein by reference.

BRIEF DESCRIPTION OF DRAWINGS

FIGS. 4a-b are the block diagrams which illustrates the possible connections of the modem/fax and telephone to the voice/data switch;

DESCRIPTION OF THE PREFERRED EMBODIMENTS

Figure 1:
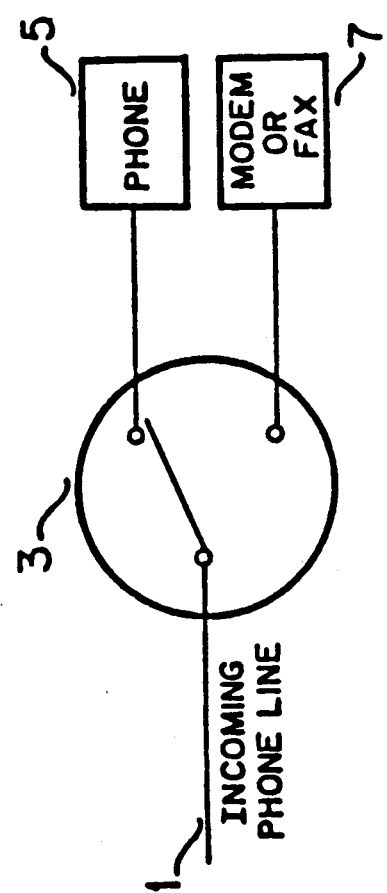
FIG. 1 is a diagram of a prior art arrangement employing a relay inserted in a phone line.

FIG. 1 is illustrative of a prior art attempt to connect an incoming call with either a voice phone or digital data device. The diagram shows a relay 3 connected between an incoming phone line 1 and a local voice phone 5 or a modem or a facsimile data machine 7. In principle, by flipping relay 3, the incoming phone line may be connected to either the local phone or to the data machine. However, there are several problems with such a simple device:

1. Many users wish to connect the local phone into the data machine in order to make outgoing calls to other data machines via the local phone. This is not possible with the arrangement shown in FIG. 1.
2. It is not possible to make outgoing phone or digital data calls without the user being bothered by having to flip the relay into the proper position before initiating the call.
3. Setting the relay into the appropriate position to receive either an incoming voice call or a digital data call without user intervention requires intelligent electronics that do not exist.
4. A useful voice/data switch must be able to perform auxiliary functions such as ringing the local phone or modem/fax after it decides which unit is being called, monitoring calls to hang up the local unit at the completion of an outgoing call, hanging up when the caller does, etc. None of these tasks can be performed with the prior art arrangement shown in FIG. 1.
5. The device shown in FIG. 1 will not work if there is more than one phone on the local line unless it is inserted into the line before, i.e., upstream of all of the phones. This is difficult or impossible to do in many phone installations.

The prior art has attempted to overcome some of the above problems. For example, problem 4 is partially overcome by the devices disclosed in U.S. Pat. Nos. 4,584,434 and 4,660,218 and Japanese Patent Publication No. 60-259058.

Attempts have been made in the prior art to overcome problem 3, but they have led to compromises or inconvenience to the calling or the called party. For example, in the systems disclosed in Japanese Patent No. 59-231964 and U.S. Pat. No. 4,584,434, the calling party must push buttons to put the voice/data switch into the data receiving mode. This is an inconvenience to the caller, especially if he does not know that this type of switch is on the receiving end of the call. The system disclosed in U.S. Pat. Nos. 4,584,434 and 4,660,218, U.K. Patent No. 2,166,624A. and Japanese Patent No. 60-259058, ring the local phone on incoming data calls, which unnecessarily disturbs the receiving party. U.S. Pat. No. 4,660,218 describes a system that only works if the calling data machine emits calling tones, which is not universally the case. The system of U.S. Pat. No. 4,660,218 and Japanese Patent No. 60-259058 can destroy an incoming data transmission if the local phone is taken off-hook at the wrong time. According to Japanese Patent No. 61-167263, to complete an incoming call through the voice/data switch, the local phone must be picked up on the first ring, while to complete an incoming data call, the caller must call twice. Still further, Japanese Patent No. 60-259 058 requires that the voice/data switch emits data tones which typically are an annoyance for the calling party.

In addition to the above summarized inconveniences and shortcomings of prior art voice/data switches, the prior art fails to recognize and solve problems 1, 2, or 5, described above.

Figure 2:
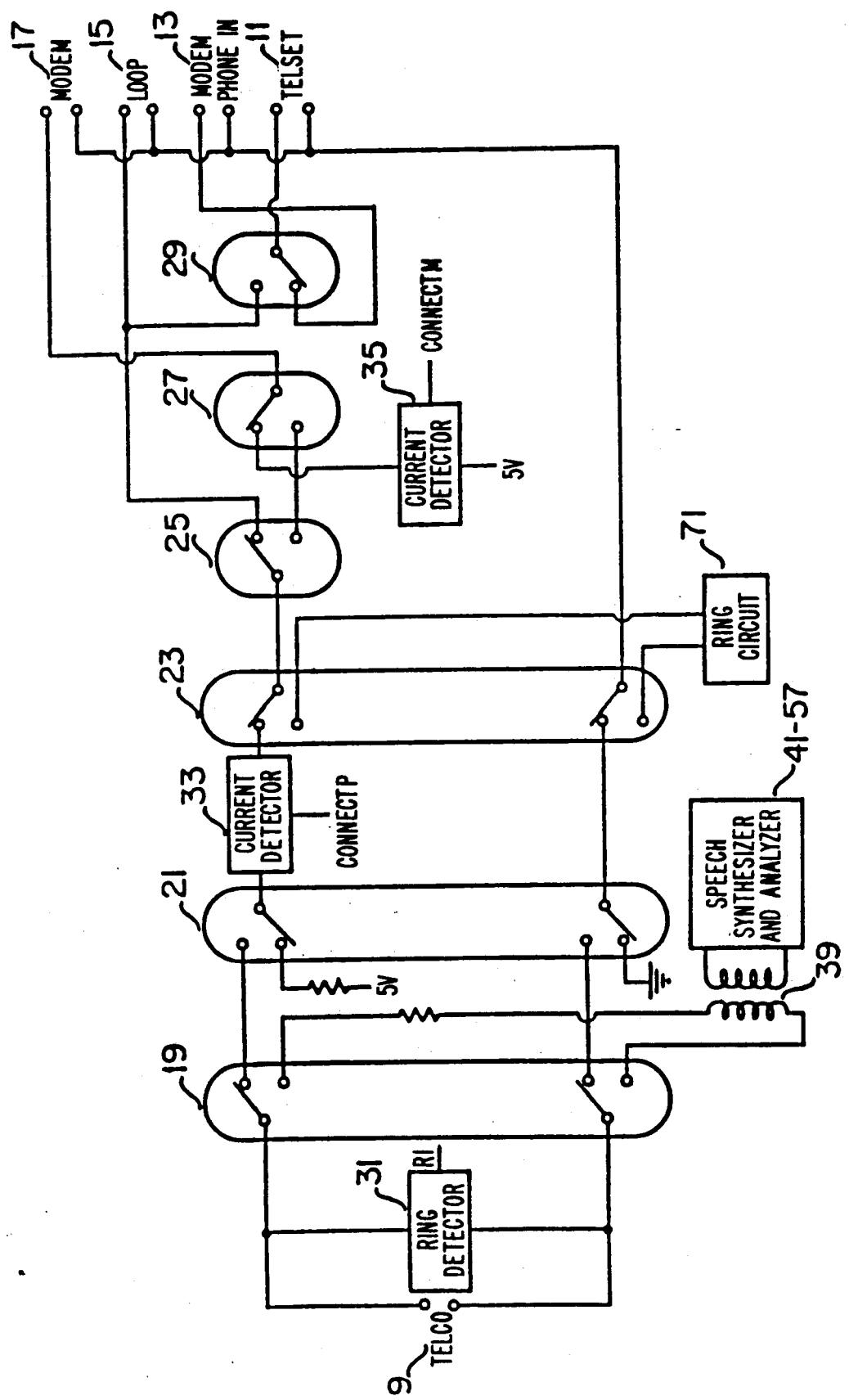
FIG. 2 is a block diagram of the voice/data switch of the present invention.
Figure 3A:
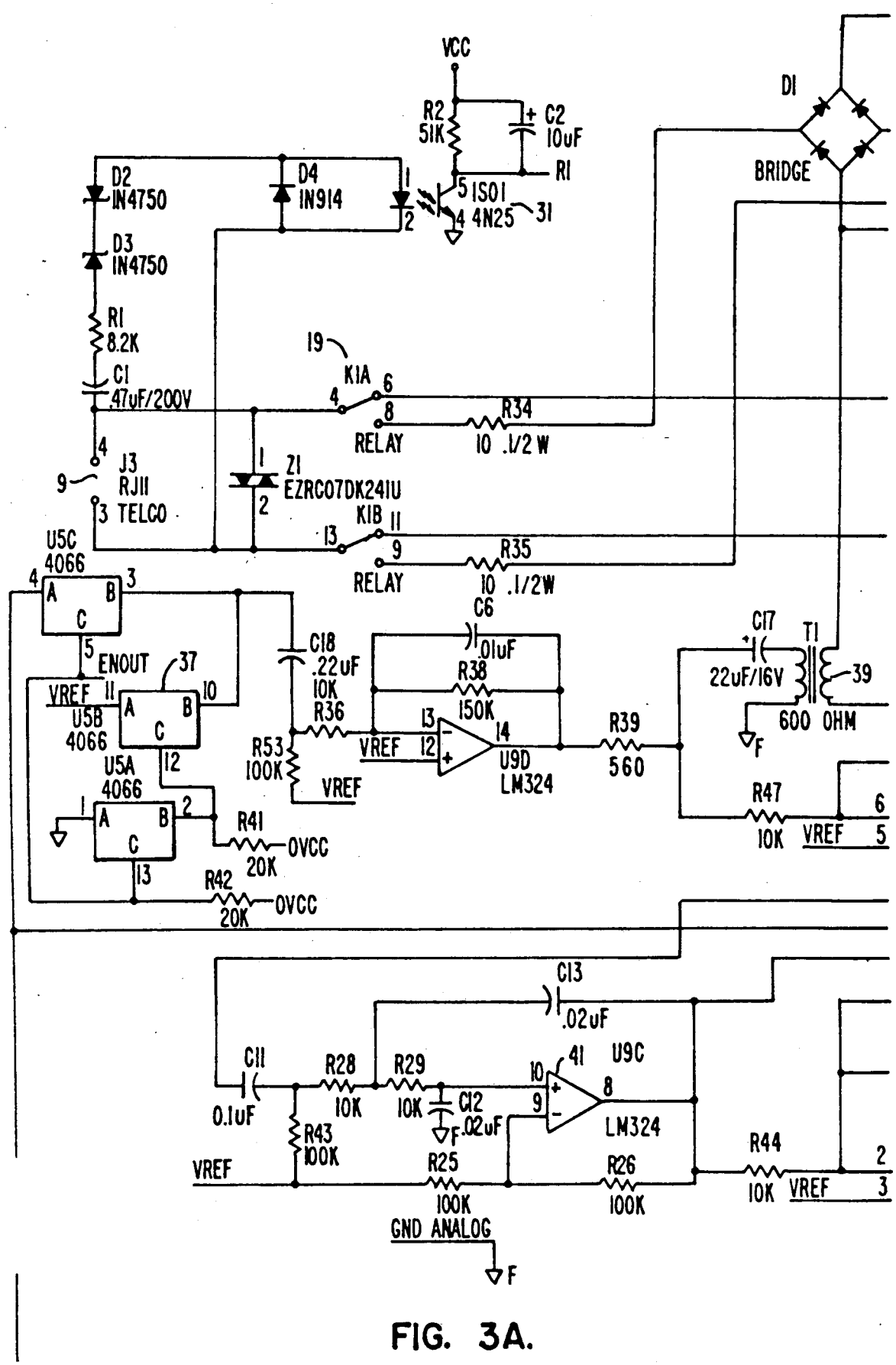
FIGS. 3A-3F are the circuit diagram of the voice/data switch schematically shown in FIG. 2.
Figure 3B:
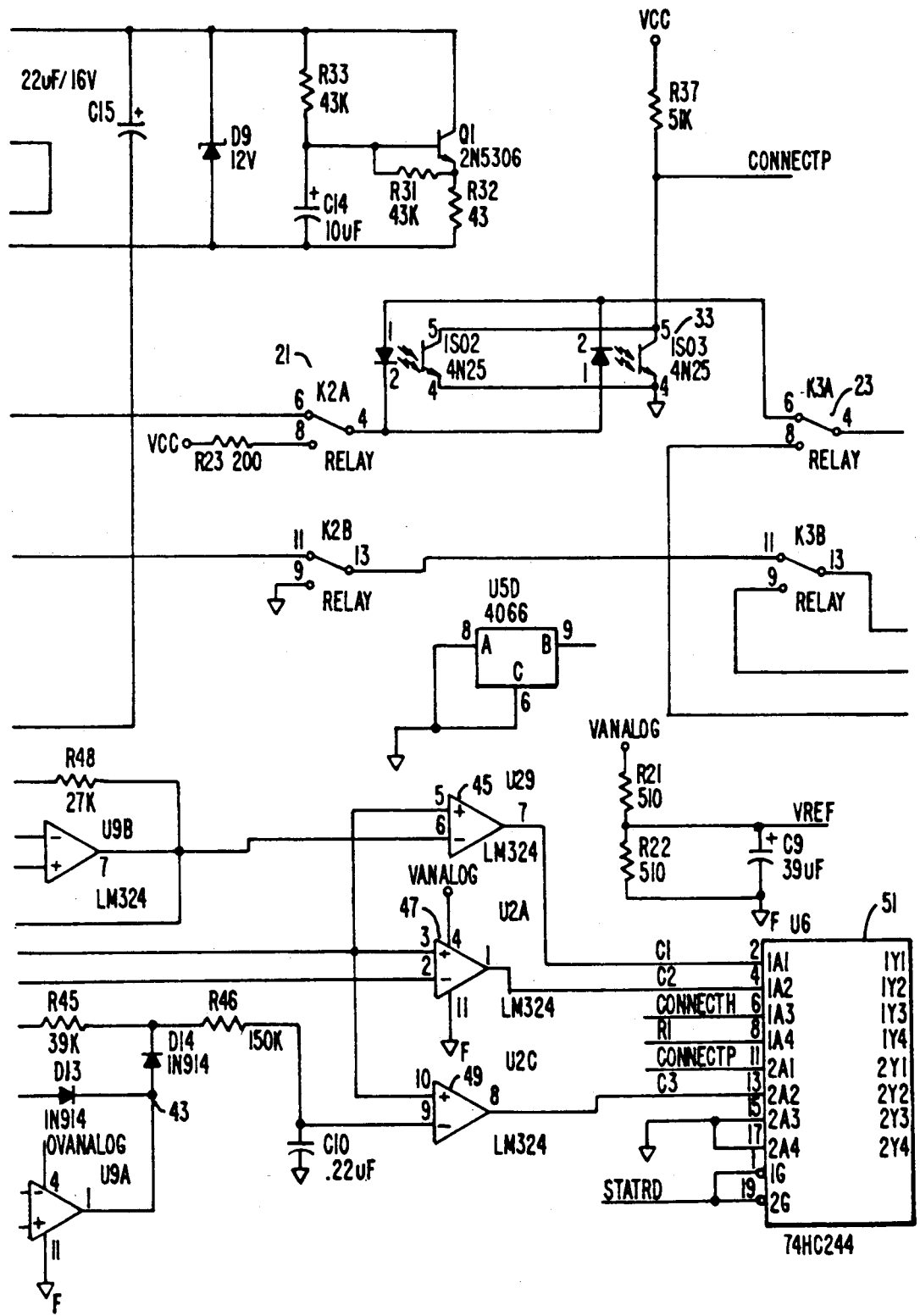
Figure 3C:
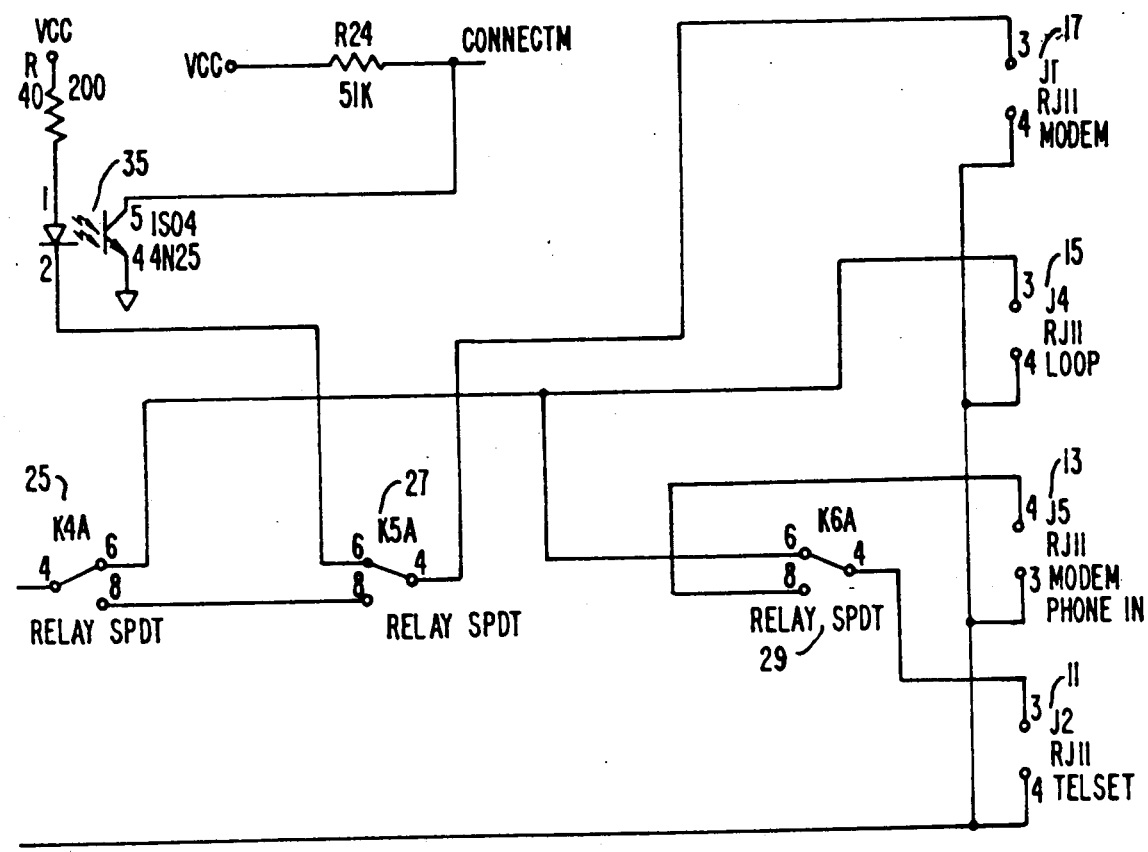
Figure 3C:
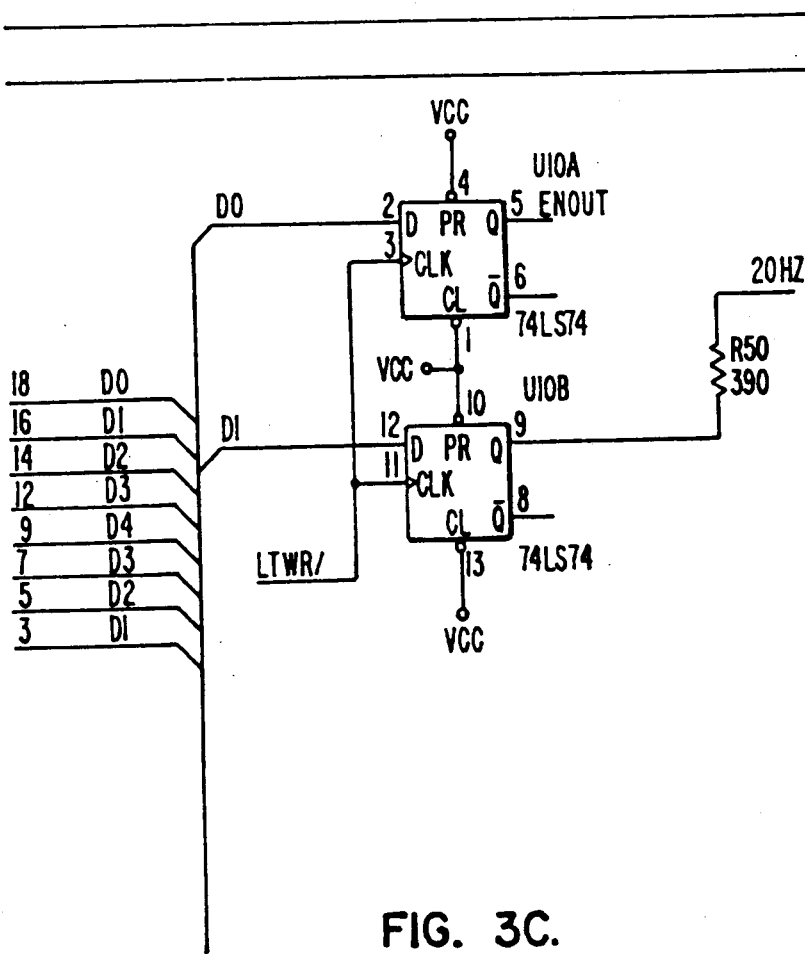
Figure 3D:
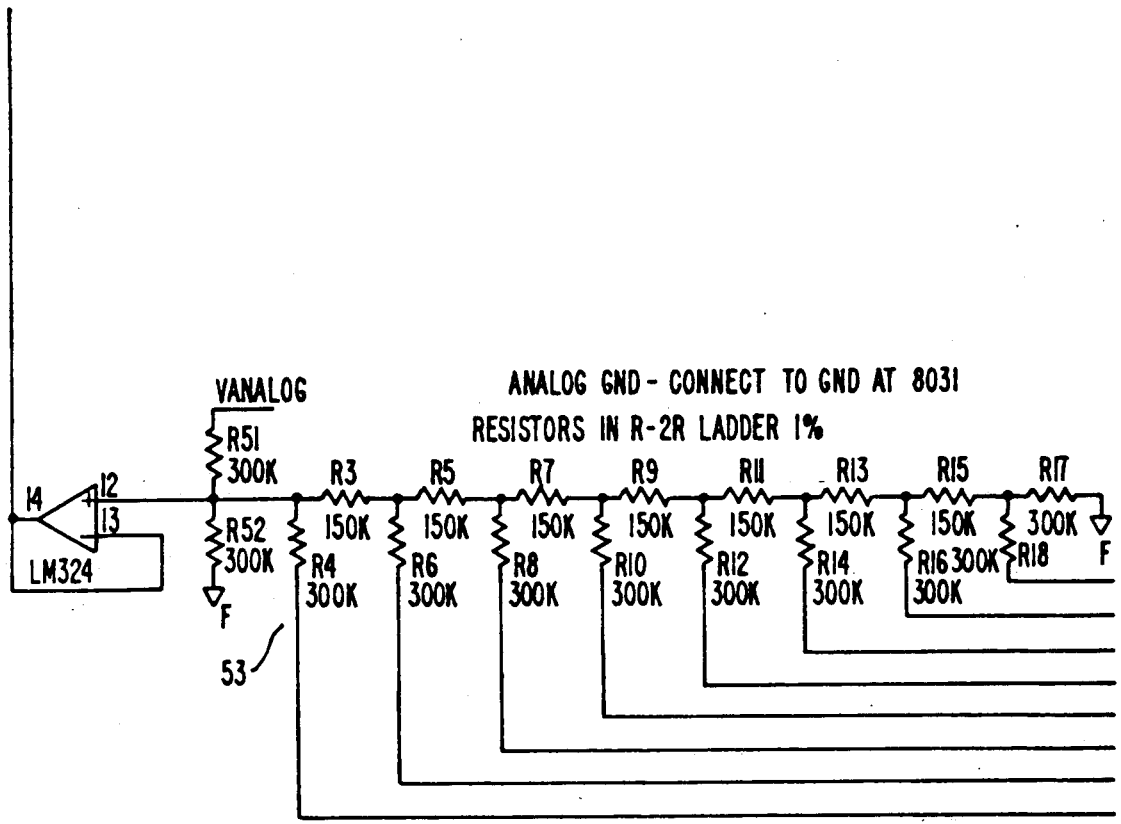
Figure 3D:
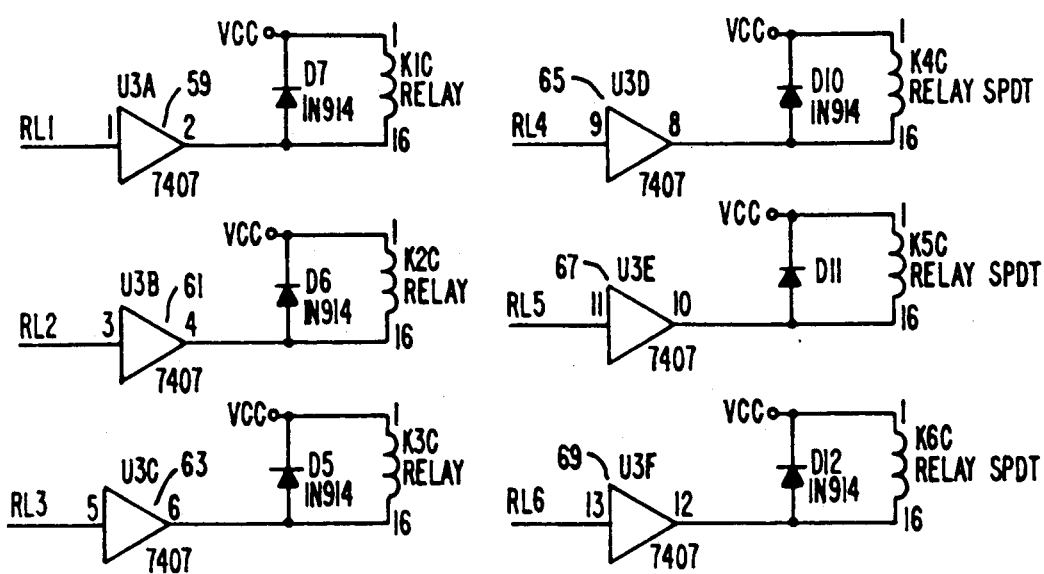
Figure 3E:
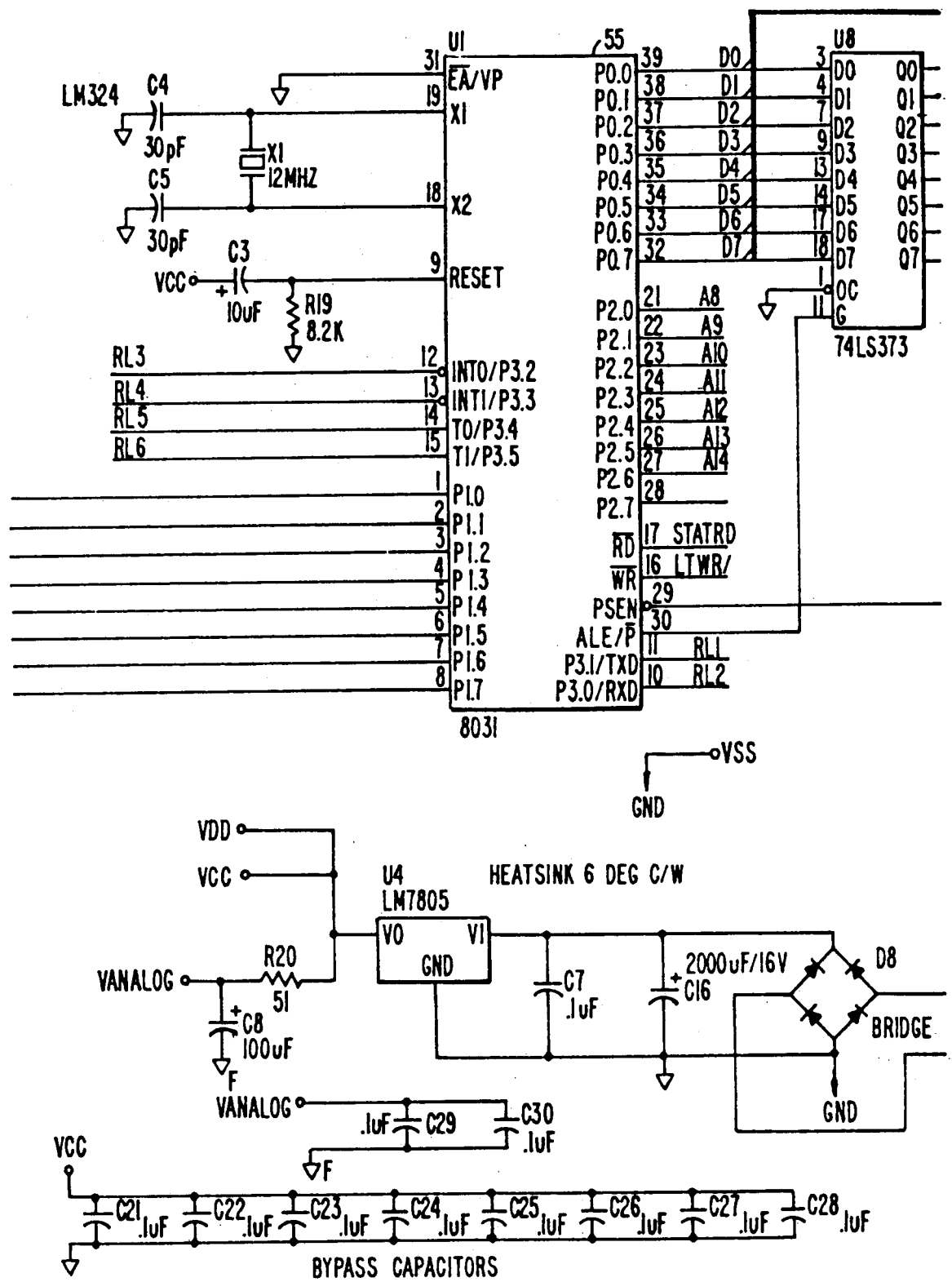
Figure 3F:
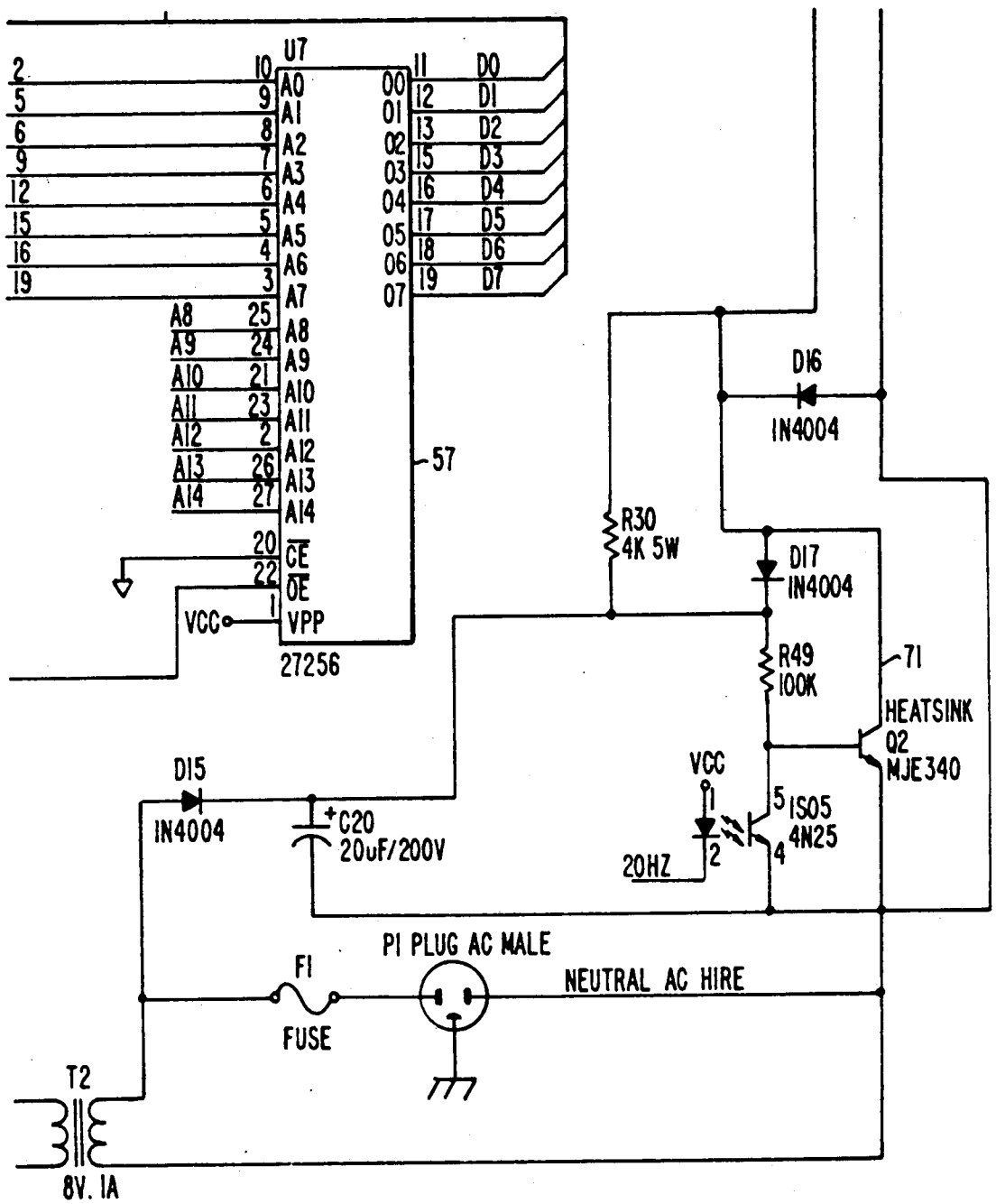
Figure 3:
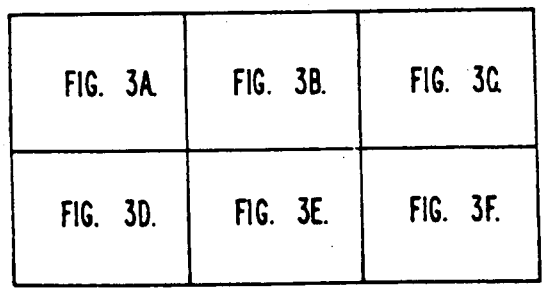

To overcome these and other difficulties, the present invention provides a voice/data switch 2, whose block diagram and circuit are illustrated in FIGS. 2 and 3. For clarity, connections not shown in the circuit diagram of FIG. 3 are listed in the following Table I.

TABLE I (Connections Not Illustrated in FIG. 3)

RL1: pin 1 of U3A (7407) to pin 11 of U1 (8031)
RL2: pin 3 of U3B (7407) to pin 10 of U1 (8031)
RL3: pin 5 of U3C (7407) to pin 12 of U1 (8031)
RL4: pin 9 of U3D (7407) to pin 13 of U1 (8031)
RL5: pin 11 of U3E (7407) to pin 14 of U1 (8031)
RL6: pin 13 of U3F (7407) to pin 15 of U1 (8031)
STATRD: pins 1 and 19 of U6 (74HC244) to pin 17 of U1 (8031)
LTHR: pin 11 of U10B (74LS74) to pin 16 of U1 (8031)
A8: pin 25 of U7 (27256) to pin 21 of U1 (8031)
A9: pin 24 of U7 (27256) to pin 22 of U1 (8031)
A10: pin 21 of U7 (27256) to pin 23 of U1 (8031)
A11: pin 23 of U7 (27256) to pin 24 of U1 (8031)
A12: pin 2 of U7 (27256) to pin 25 of U1 (8031)
A13: pin 26 of U7 (27256) to pin 26 of U1 (8031)
A14: pin 27 of U7 (27256) to pin 27 of U1 (8031)
ENOUT: pin 5 of U5C (4066) to pin 5 of U10A (74LS74)
20 Hz: pin 9 of U10B (74LS74) to pin 2 of ISO5 (4N25)
RI: pin 5 of ISO1 (4N25) to pin 8 of U6 (74HC244)
CONNECTP: pin 5 of ISO3 (4N25) to pin 11 of U6 (74HC244)
CONNECTM: pin 5 of ISO4 (4N25) to pin 6 of U6 (74HC244)

All the points labelled Vref are to be tied together.
These exist at
Pin 11 of U5B (4066)
Pin 12 of U9D (LM324)
Pin 5 of U9B (LM324)
Positive side of C9
R53 (100K)
R43 (100K)
Pin 3 of U9A (LM324)
All analog ground points are to be tied together.
On the analog IC's the ground pins are
U2 LM324 Pin 11
U9 LM324 Pin 11
All digital ground points are to be tied together. On the digital IC's the ground pins are

| U1 | 8031 | Pin 20 |
| U3 | 7407 | Pin 7 |
| U5 | 4066 | Pin 7 |
| U6 | 74HC244 | Pin 10 |
| U7 | 27128 | Pin 14 |
| U8 | 74LS373 | Pin 10 |
| U10 | 74LS74 | Pin 7 |

The analog ground is to be tied to the digital ground at only one place near the 8031, as is described in the layout instructions accompanying the circuit diagram. All the points labelled VANALOG are to be tied together. On the analog IC's, the power pins which are tied to VANALOG, are:

| U2 | LM324 | Pin 4 |
| U9 | LM324 | Pin 4 |

All the points labelled VCC or VDD are to be tied together. On the digital IC's, the power pins, which are tied to VCC, are:

| U1 | 8031 | Pin 40 |
| U3 | 7407 | Pin 14 |
| U5 | 4066 | Pin 14 |
| U6 | 74HC244 | Pin 20 |
| U7 | 27128 | Pin 28 |
| U8 | 74LS373 | Pin 20 |
| U10 | 74LS74 | Pin 14 |

Referring to FIGS. 2, 3, 4a and 4b, the incoming phone line is connected to a phone jack 9, the telephone is connected to a phone jack 11, and the data machine is connected to a phone jack 17. If the user wishes the phone to be plugged into the data machine during outgoing calls, phone jack 13 is connected to the phone input jack on data machine 7 to produce the connections illustrated in FIG. 4a. Otherwise phone jack 13 is connected to phone jack 15 to obtain the circuit shown in FIG. 4b.

The relays 19, 21, 23, 25, 27, and 29, are shown in their power-off configuration in FIG. 3, denoted as 19U, 21U, 23U, 25U, 27U, 29U. (Note that "19U" means that relay 19 is in the up position in the circuit diagram. Other possibilities are "19D", for relay 19 in the down position or "19O", for relay 19 oscillating between the up and down positions). In the power-off configuration, the local phone is connected to the phone line and incoming or outgoing phone calls may be made.

When power is applied to the circuit of FIGS. 2 or 3, software residing in memory 57 is utilized by microprocessor 55 to control the operation of the circuit. In particular, microprocessor 55 causes relay drivers 61 and 69 to operate, thereby flipping relays 21 and 29, so the state of the system becomes 19U, 21D, 23U, 25U, 27U, 29D. This state, referred to as the QUIESCENT CONDITION, is illustrated in FIG. 2. In this condition, the local phone is connected through phone jack 11 and relay 29 to phone jack 13, and thence to the phone input on the data machine or to phone jack 15, depending on how the initial connections were made. Thus, the first objection to the prior art arrangement shown in FIG. 1 is overcome by the voice/data switch 2 of the present invention.

In the QUIESCENT CONDITION, microprocessor 55 monitors signals RI (coming from opto-isolator 31 through electronics 51), CONNECTP (coming from opto-isolator 33 through electronics 51), and CONNECTM (coming from optoisolator 35 through electronics 51). If RI goes low, there is an incoming phone call, if CONNECTP goes low the phone is off-hook, and if CONNECTM goes low, the data machine is off-hook.

If CONNECTM goes low because the data machine is taken off-hook, microprocessor 55 activates relay drivers 65, 67, and 69, so the state of the system becomes 19U, 21U, 23U, 25D, 27D, 29D. In this state, the data machine is connected to the phone line. CONNECTP is then monitored since its level goes high when the data machine is hung up. When this happens, microprocessor 55 returns the system to the QUIESCENT CONDITION to await the next activity. Thus, the user is able to make outgoing data machine calls without being aware of the presence of the voice/data switch.

If CONNECTP goes low because the phone is taken off-hook, microprocessor 55 activates relay drivers 67 and 69, so the state of the system becomes 19U, 21U, 23U, 25U, 27D, 29D, in which case the telephone is connected to the phone line. CONNECTP is then monitored, since it goes high when the phone is later hung up. When this happens microprocessor 55 returns the system to the QUIESCENT CONDITION where it awaits the next activity. Since the user is thereby able to make outgoing phone or data calls without being aware of the presence of the voice/data switch, the second objection to the prior art is overcome by the voice/data switch of the present invention.

RI goes low on the first cycle of the incoming phone line ring, which is before the local phone actually rings. At this time voice/data switch 2 enters a mode of operation that overcomes the third and fourth objections to the prior art. Microprocessor 55 activates all relay drivers such that the state of the system becomes 19D, 21D, 23O, 25D, 27D, 29D. It also sets ENOUT high.

Because relay 19 is in the down position, the incoming line is connected to a DC and AC load, so it thinks that the call has been answered. Audio signals on the incoming line are then coupled to the analysis electronics in the voice/data switch through transformer 39, and audio messages from the voice/data switch to the incoming phone line may also be routed to the calling line through this transformer.

When oscillating relay 23 is down, a 70 volt, 20Hz square wave, generated by electronics 71, is placed on the local data machine line, which causes it to ring. Thus, the local data machine is called by the voice/data switch as soon as there is an incoming call, in order to save time later if the incoming call is from a data machine. When oscillating relay 23 is up for four seconds between each two second ring, CONNECTP is monitored by microprocessor 55, since CONNECTP will go low when the local data machine answers the voice/data switch ring. When this happens, relay 23 is held in the up position, so the ring on the local data machine line is terminated and the local data machine awaits determination by the voice/data switch as to whether the incoming call is for it.

When ENOUT is set high by microprocessor 55, the output of R-2R ladder 53 is connected through switches 37 and transformer 39 to the incoming phone line. In this configuration, speech synthesized by microprocessor 55 from data stored in memory 57 is converted from digital to analog information by R-2R ladder 53, and thence, sent to the incoming phone line. In this way, the following synthesized message is spoken to the caller as soon as the incoming call is answered by the voice/data switch:

"The number you have reached accepts either conversation or modem (fax) data. If you want to connect your modem (fax) to our modem (fax), please switch to your modem (fax) now. If you want to speak with someone, please stay on the line".

During pauses in the above sentences, ENOUT is set low by microprocessor 55. This flips relays 37 such that the output of the R-2R ladder 53 is not connected to transformer 39, and the R-2R ladder is used to generate variable analog levels without such levels producing audio signals on the incoming line. These variable analog levels are fed into comparators 45, 47, and 49, where they are compared to signals coming from the input line via transformer 39. The signal to comparator 47 is passed through low pass filter 41 and the signal to comparator 49 is passed through circuit 43, which measures the average amplitude of the filtered audio signal from the input line. The outputs C1, C2, and C3, of comparators 45, 47, and 49, are passed through electronics 51 to microprocessor 55 where they are analyzed in combination with microprocessor controlled changes of the output of the R-b 2R ladder. These analyses give the amplitude of the level on the input line and the statistics of the time between zero crossings of the input data. In this way, the noise on the input line is determined from the amplitude of the audio level and periodic signals on the input line (coming from tones) are distinguished from random noise by the statistics of the time between zero crossings. Techniques of threshold and zero crossing analyses are well known in the prior art (U.S. Pat. Nos. 3,873,772, 4,356,348, and 4,469,916, for example).

If there is a dial tone on the input line (because the caller has hung up), the voice/data switch terminates its analysis and resets itself into the QUIESCENT CONDITION to await the next call. If there are tones on the input line associated with data machine calling protocols, the voice/data switch terminates its analysis and connects the incoming call to the data machine in the manner described below. If neither of these conditions apply, ENOUT is set low for 4.5 seconds by microprocessor 55. This 4.5 second interval allows the caller to connect his data machine to the incoming line if he wishes to do so, and it is also sufficient to detect any possible calling data machine tone or a dial tone, since such tones can have periods of silence as long as 4 seconds. If a dial tone is detected, the voice/data switch terminates its analysis and resets itself into the QUIESCENT CONDITION. If a data machine tone is detected, the voice/data switch terminates its analysis and connects the incoming call to the data machine in the manner described below. If neither of these conditions apply, ENOUT is set high after 4.5 seconds and the following message is synthesized by microprocessor 55:

"What can I do for you?"

During the next three seconds ENOUT is set low and signals on the incoming phone line are analyzed in the manner described above. If, during these three seconds, the level of the audio signal is not sufficiently above the previously measured noise threshold, then there is no audio response to the above message and the caller is a data machine. In this case, the voice/data switch connects the incoming call to the local data machine in the manner described below. If, during these three seconds, the level of the audio signal is suitably greater than the noise threshold previously measured, and if this signal is not periodic (i.e., it is not a calling modem tone or a dial tone), then a human is talking into the phone line in response to the synthesized message. In this case, at the end of the incoming speech when the measured input signal is near the previously measured noise level, ENOUT is set high and the following synthesized message is spoken into the incoming phone line:

"One moment please".

Microprocessor 55 then activates relay drivers 59, 61, 63, and 67, to cause the relays to be in the state 19D, 21D, 230, 25U, 27D, 29U. This puts a ring tone on the local telephone and causes the caller to hear this tone. When relay 23 is up during the 4 second pause between the two second rings, CONNECTP is monitored by microprocessor 55, since CONNECTP goes low when the local phone is taken off-hook. If this happens, relay driver 67 is activated by microprocessor 55 (and relay drivers 59, 61, 63, 65, and 69 are not activated) such that the relays are in the state 19U, 21U, 23U, 25U, 27D, 29U. This connects the incoming call to the answered local phone. CONNECTP is then monitored by the voice/data switch since it goes high at the end of the phone conversation when the local phone is hung up. The voice/data switch is then returned to the QUIESCENT CONDITION to await the next call.

If the local phone is not answered in eight rings, the voice/data switch synthesizes the following message:

"There is no answer on that line. Please try your call again later".

It then returns to the QUIESCENT CONDITION to await the next call.

If, in the above process, it is determined that the incoming call is from a data machine, then it is verified that the local data machine has answered the previously applied ring because CONNECTP is low. If CONNECTP does not go low after 8 rings or if there is a dial tone on the incoming line at this time, the voice/data switch is returned to the QUIESCENT CONDITION to await the next call. When CONNECTP goes low, the relays are set into the condition 19U, 21U, 23U, 25D, 27D, 29D, which connects the incoming call to the local data machine. CONNECTP is then monitored by microprocessor 55 since it goes high at the end of the data communication. At this time, the voice/data switch is returned to the QUIESCENT CONDITION to await the next call.

Figure 5:
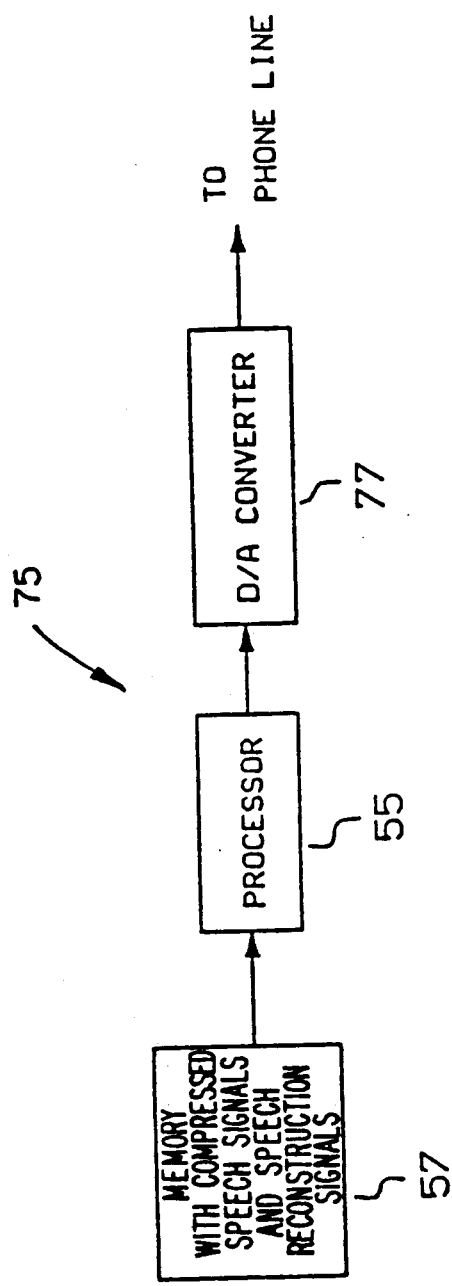
FIG. 5 is a block diagram of a preferred speech synthesizer embodied in the voice/data switch of the present invention.

Referring to FIGS. 3 and 5, a preferred speech synthesizer 75 employed in voice/data switch 2 utilizes components already in the switch. Digital, compressed speech information signals and the necessary speech reconstruction signals are stored in memory 57. When one of the above-described voice messages is to be sent out, processor 55 reconstructs the message from the appropriate information and reconstruction signals, as is more fully described, for example, in the earlier mentioned U.S. Pat. No. 4,384,170. The reconstructed (or synthesized). digital speech signals are converted into analog signals, i.e. speech wave forms, in a digital-to-analog converter 77, such as the earlier described R-2R ladder 53. The resulting, audible speech signals are then applied by switch 2 to the incoming phone line and sent to the caller.

The above description illustrates how the embodiment of the invention illustrated in FIGS. 2, 3, 4a and 4b overcomes the first four problems of prior art devices. The present invention also overcomes the fifth objection to prior art systems, namely their inability to work properly when there is more than one phone on the incoming phone line unless they are connected in a configuration that is often difficult or impossible to achieve.

Referring now to FIGS. 6a-c and 7, FIG. 6a illustrates an arrangement in which voice/data switch 2 is connected between incoming phone line 1, local phone 5, a second local phone 6, and modem or fax 7. The proper configuration and line position of the voice/data switch is shown. Phones 5 and 6 are disconnected from the line on incoming or outgoing data calls and they are used in the normal manner on incoming or outgoing voice calls. However, it is necessary that the voice/data switch is installed ahead, i.e., upstream of the local phones. It is frequently inconvenient or impossible to install the voice/data switch in incoming phone line 1 before it branches off to phones 5 and 6 since the location of the incoming phone line may not be known, it may be located where the voice/data switch and data machine should not be placed, or it may require extensive re-wiring of phone lines to achieve the desired configuration.

Figure 6A:
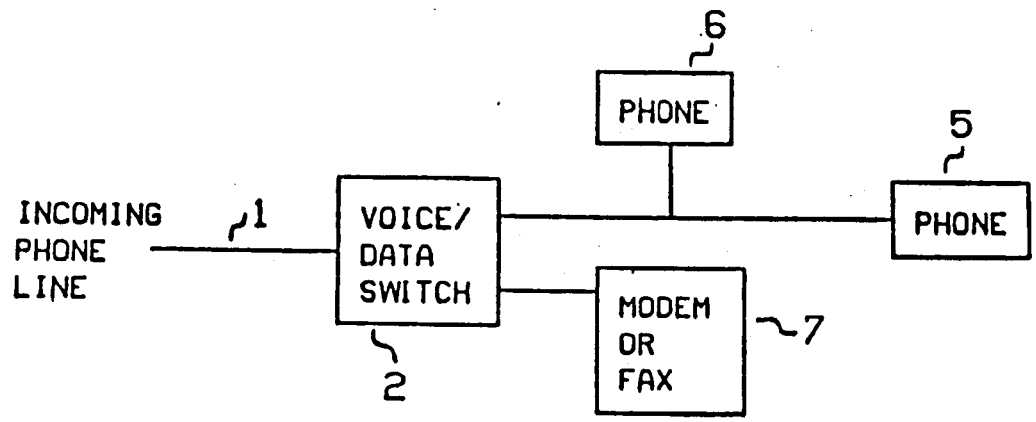
FIGS. 6a-c comprises three block diagrams illustrating configurations for inserting the voice/data switch into a phone line containing two phones.
Figure 6B:
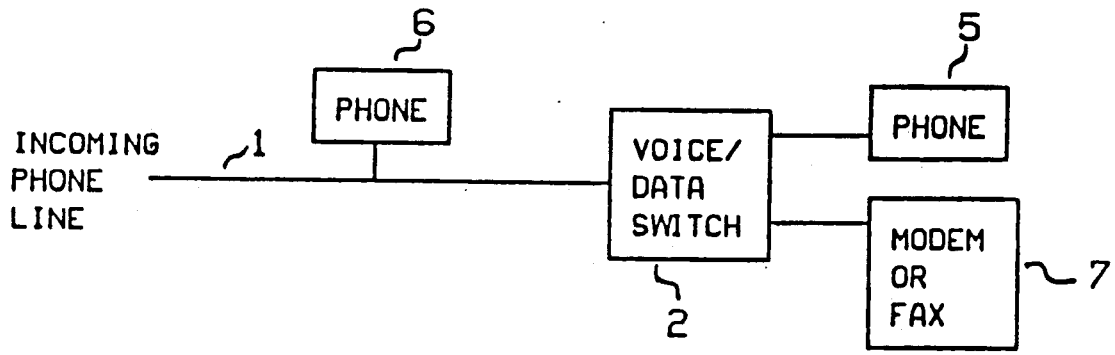

Thus, as a practical matter it may be necessary to install the voice/data switch behind, i.e., downstream of phone 6 as is shown in FIG. 6b. The problem with this configuration is that phone 6 rings on incoming data calls (which is an annoyance for people who are near it). Further, phone 6 can be taken off-hook during incoming or outgoing data calls (which destroys the data transmission).

Figure 6C:
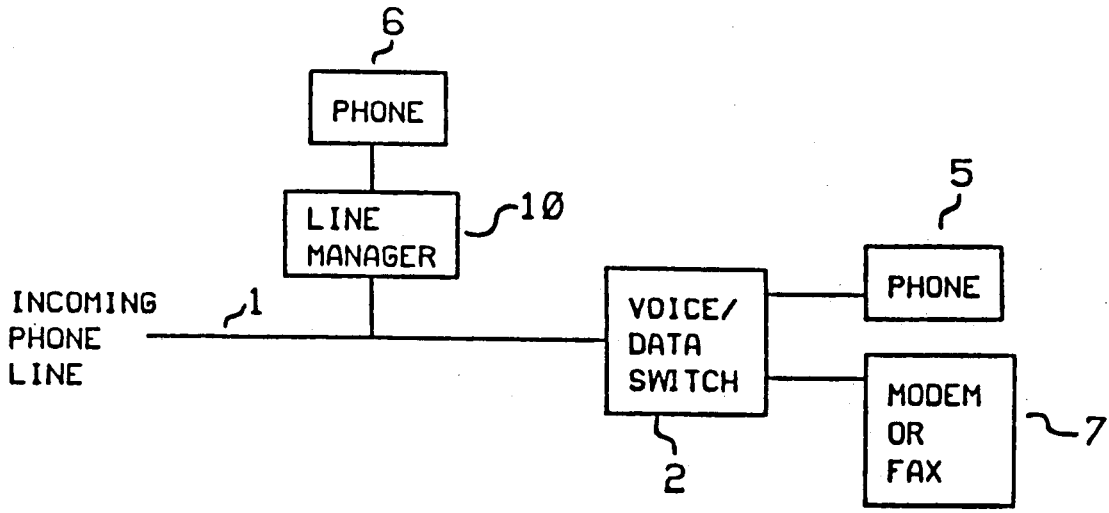

To overcome these problems, another preferred embodiment of the present invention, illustrated in FIG. 6c. inserts a line manager 10 between phone 6 and the incoming phone line 1. The line manager is responsive to three different tones that may be placed on incoming phone line 1 by generation of sinusoidal signals in voice/data switch 2 by the action of microprocessor 55 and digital-to-analog converter or R-2R ladder 53 (shown in FIG. 3). Thus, line manager 10 operates in a slave mode in response to commands it receives from the voice/data switch 2.

Figure 7A:
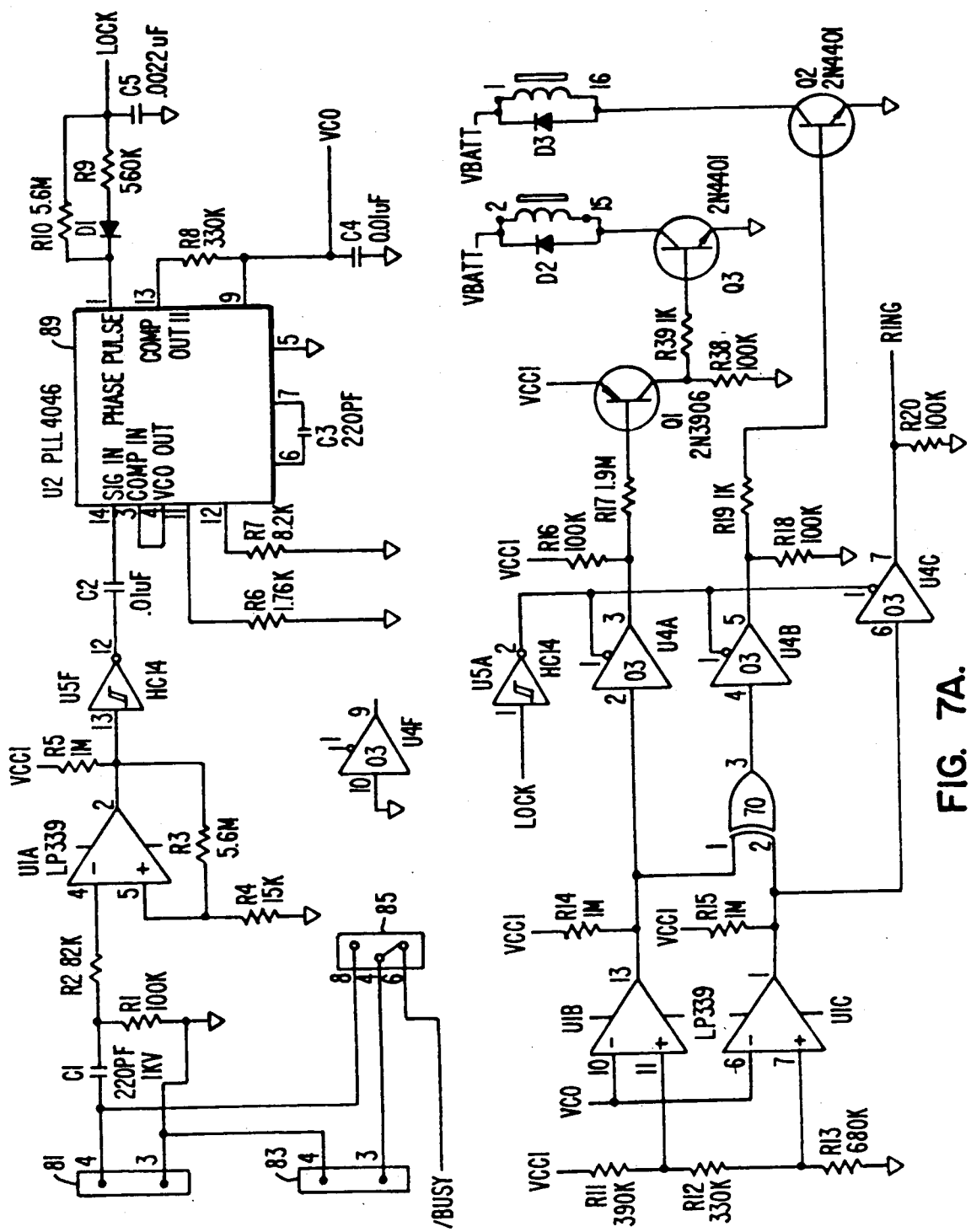
FIGS. 7A-7B are the circuit diagram of another aspect of the present invention for use with the voice/data switch in systems having two or more phones on a single line.
Figures 7, 7B:
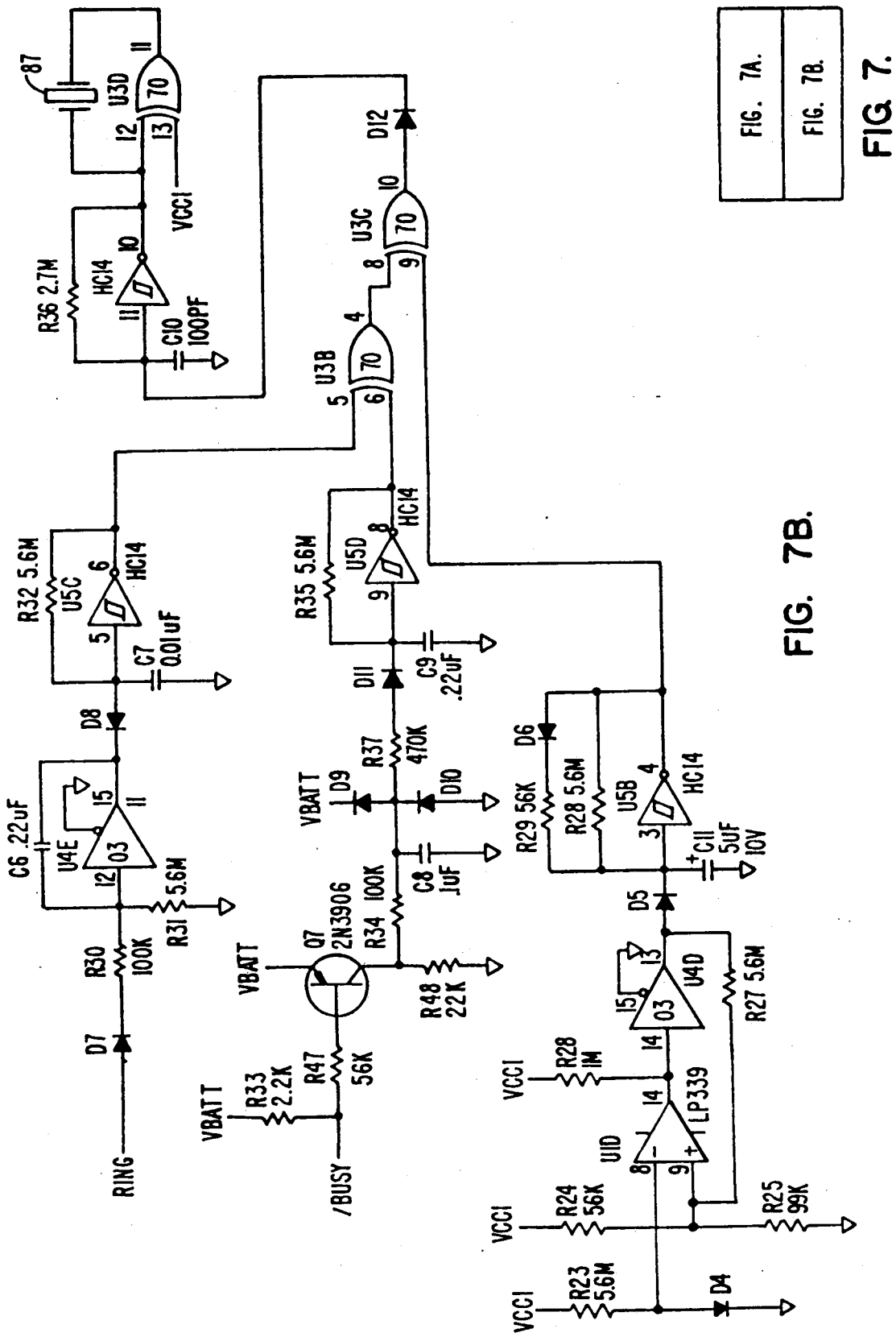

A circuit diagram of the line manager is shown in FIG. 7. Incoming phone line 1 is plugged into a phone jack 81 and phone 6 is plugged into a phone jack 83. When the contacts of a latching relay 85 are in the position shown in FIG. 7, phone 6 is not connected to incoming phone line 1 while it is connected to incoming phone line 1 when latching relay 85 is in the opposite configuration.

The three commands sent to line manager 10 by voice/data switch 2 are

| COMMAND | FREQUENCY | ACTION |
| --- | --- | --- |
| 1 | 8000 Hz | Ring piezo speaker 87 |
| 2 | 12000 Hz | Latch relay 85 in up position |
| 3 | 16000 Hz | Latch relay 85 in down position |

In the QUIESCENT CONDITION, relay 85 is latched in the down position and phone 6 is connected to phone line 1. Thus, one can make outgoing phone calls in the normal manner with either phone 5 or phone 6. Voice/data switch 2 senses when data or fax machine 7 goes off-hook in the earlier described manner and sends command 2 to line manager 10. It thereby positions latch relay 85 in the up position and disconnects phone 6 from incoming phone line 1 on outgoing data calls. When voice/data switch 2 senses the end of the outgoing data call in the manner previously described, it sends command 3 to line manager 10, thereby moving relay 85 to its down position and connecting phone 6 to receiving phone line 1 so that the system is again in the QUIESCENT CONDITION.

When incoming phone line 1 first rings on an incoming call, voice/data switch 2 detects the ring in the manner previously described, and it sends command 3 to line manager 10 to disconnect phone 6 from incoming phone line 1 while the voice/data switch determines if the incoming call is a voice or a data call. If it is a data call, relay 85 is left latched in the up position until the call is completed. If the incoming call is a voice call, voice/data switch 2 sends command 3 to line manager 10, which connects phone 6 to incoming phone line 1. Then, each time voice/data switch 2 rings phone 5, it also sends command 1 to line manager 10, which causes piezo speaker 87 to generate a ring in the vicinity of phone 6. If phone 6 answers the call, this action is sensed by a line voltage monitor in voice/data switch 2. This causes the voice/data switch to stop ringing phone 5 and line manager 10 and to monitor the line voltage in order to sense the termination of the incoming phone call. (Note that the line voltage monitor is not shown in FIG. 3. Line voltage monitoring is well-known in the prior art and it is described, for example, in U.S. Pat. No. 4,458,434).

Another function of line manager 10 is to cause piezo speaker 87 to generate a busy tone when phone 6 is taken-off hook while the phone line is in use, e.g., while an incoming call is analyzed or a data call is being handled. In either of these cases, relay 85 is in the up position. Thus, when phone 6 is taken off-hook, the signal, "busy", goes low and this causes piezo speaker 87 to generate a busy signal.

Line manager 10 utilizes phaselocked loop 89 to produce the output digital signal, "lock" and the output voltage, "VCO", when it senses a pure tone. The three frequencies of the command tones produce three different voltages on the VCO line, and the level of the voltage on VCO is used by the analysis electronics of FIG. 7 to distinguish between commands 1, 2, and 3. The operation of this circuitry is well-known to anyone skilled in the art of digital and analog circuitry and is therefore not further described herein.

Figure 8:
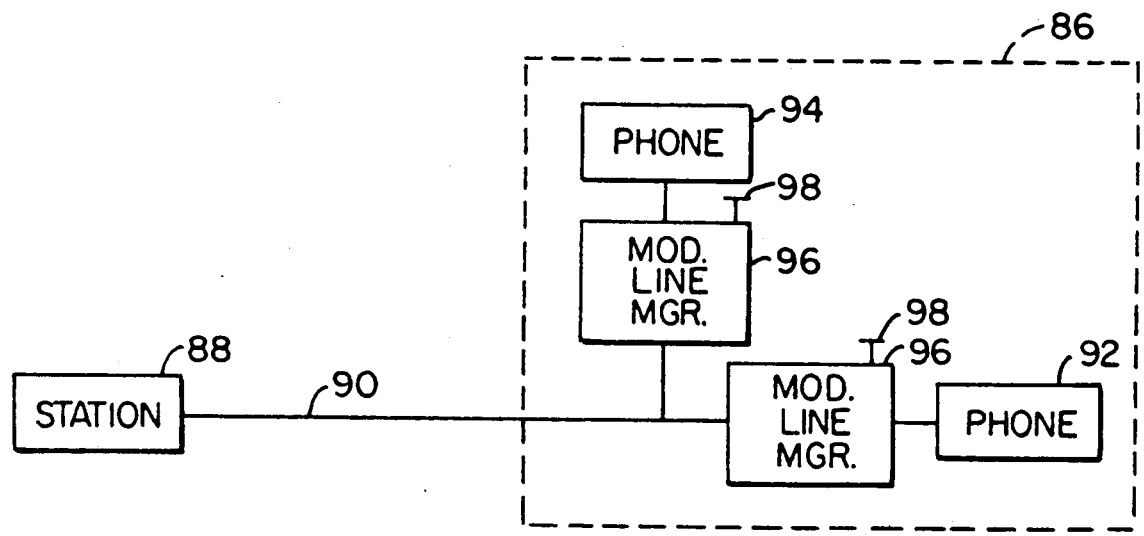
FIG. 8 is a block diagram of a simplified embodiment of the invention for optionally preventing two or more phones from simultaneously accessing a telephone line.

The above-described concept of employing a line manager to prevent a telephone located upstream from the voice/data switch from accessing the telephone line while the fax machine, for example, is in its sending or receiving mode can be employed to provide privacy for individual phones when there are multiple extensions. Referring to FIG. 8, two-way telephone communication between first and second stations 86, 88 can be conducted over a communication line 90. Two (or more) conventional voice phones 92, 94 are connected to the line at the first station. In a conventional setup, each phone can be picked up to access the line irrespective of whether or not it is in use. To prevent an unwanted overhearing or interruption of an ongoing telephone conversation, for example, a modified line manager 96 is placed between each telephone and the communication line 90.

The line manager can be identical to line manager 10 described above and shown in FIGS. 6c and 7 although, in the most basic form of this aspect of the invention, it is modified so that it is, in essence, only an on-off switch and includes a button actuated signal emitter 98 for triggering the on-off switch of the other line managers. In this embodiment, the line managers 96 are normally closed, i.e., they normally connect each phone with the communication line 90. If phone 92, for example, is in use and the user desires privacy, the button of emitter 98 is depressed to generate an electronic signal (in the manner of commands 1-3 described on page 19 above, for example) which opens the switches of all other line managers, thereby disconnecting all other phones at the first station 86 from the communication line. Upon completion of the call, when phone 92 goes on-hook again, the emitter sends a second signal, again in the nature of one of the commands described on page 19 above, to reset the switches of all other line managers to their closed position so that a call can be made from any one of the extensions. Alternatively, the line managers can incorporate line voltage monitors that sense the change in line voltage which occur when phone 92 is replaced on-hook. The voltage change can be used to reset the switches of all other line managers.

It will be apparent that additional functions, including those described above in connection with the description of FIGS. 6c and 7, can be incorporated in the modified line manager embodiment of this invention so that, for example, the line manager can be used to generate ring and/or busy sounds at the other phones.

We claim:

1. A telephone switch adapted to be interposed between a telephone line and a digital data machine and a voice phone, the switch comprising:
    means adapted to be coupled to the telephone line for receiving an incoming message or sending an outgoing message;
    means for analyzing signals of the incoming message including means for determining a periodicity in the incoming signals and means for detecting a non-periodicity in the incoming signals to determine whether the signals are digital data signals or voice signals;
    means including an electronic speech synthesizer adapted to generate from digital, compressed speech information signals first and second voice messages; the speech synthesizer generating a second outgoing voice message after a predetermined time interval following the first outgoing message when there is no response to the first message, the second outgoing message requesting the sender to send a voice message;
    means for intermittently applying the voice messages to the phone line;
    control means operatively coupled with the analyzing means and the speech synthesizer for directing the incoming message to the digital data machine or the voice phone after a voice message has been sent and in response to whether the analyzing means determined that digital data signals or voice signals form the incoming message, the directing means directing the incoming message to the digital data machine as soon as signal periodicity has been detected and to the voice phone as soon as non-periodicity in the incoming signals has been detected;
    means for monitoring when the digital data machine or voice phone becomes active in preparation for sending an outgoing message;
    means response to the monitoring means for connecting the active data machine or voice phone to the telephone line;
    means for determining when the active machine or phone becomes inactive; and
    means responsive to the determining means for disconnecting the machine or phone from the telephone line after is has become inactive.

2. A switch according to claim 1 wherein the monitoring means includes off-hook monitors operatively coupled with the digital data machine and the voice phone.

3. A switch according to claim 1 wherein the monitoring means incudes off-hook line voltage monitors operatively coupled with the machine and the phone.

4. A switch according to claim 1 wherein the analyzing means includes means for directing the incoming message to the digital data machine if, after a predetermined response period, no non-periodic signals have been detected in the incoming message.

5. A switch according to claim 4 wherein the analyzing means includes means for directing the incoming message to the digital data machine if a predetermined period of silence on the incoming line follows the second outgoing message.

6. A switch according to claim 1 wherein the communication line, when not in use, generates a dial tone, and including means for placing the switch in a standby state at any time when the analyzing means detects the dial tone.

7. A switch according to claim 1 including means for generating a ring signal and applying the ring signal to the voice phone only whenever the analyzing means has detected non-periodicity in the incoming signals.

8. A switch according to claim 7 including means operatively coupled with the ring means and the speech synthesizer for generating and sending to the sender another message advising the sender that no one responds to the incoming voice message.

9. A switch according to claim 1 including line manager means adapted to be operatively coupled with the means for directing the incoming message for preventing a voice phone connected with the telephone line upstream of the directing means from communicating with the telephone line when the data machine communicates with the line.

10. A switch according to claim 9 wherein the directing means includes control means for generating first, second and third control signals and for applying the control signals to the line manager means, and wherein the line manager means includes means responsive to the first signal for generating at the upstream voice phone an audible tone communicating phone status information to a user of the phone, means responsive to the second control signal for disconnecting the upstream phone from the line when the data machine is connected with the line, and means responsive to the third control signal for connecting the upstream phone with the line.

11. A telephone switch adapted to be interposed between a telephone line and a digital data machine and a voice phone, the switch comprising:
    means adapted to be coupled to the telephone line for receiving an incoming message or sending an outgoing message;
    means for analyzing signals of the incoming message to determine whether the signals are digital data signals or voice signals;
    means including an electronic speech synthesizer adapted to generate from digital, compressed speech information signals first and second voice messages;
    means for intermittently applying the voice messages to the phone line;
    control means operatively coupled with the analyzing means and the speech synthesizer for directing the incoming message to the digital data machine or the voice phone after a voice message has been sent and in response to whether the analyzing means determined that digital data signals or voice signals form the incoming message;

means for monitoring when the digital data machine or voice phone becomes active in preparation for sending an outgoing message;

means responsive to the monitoring means for connecting the active data machine or voice phone to the telephone line;

means for determining when the active machine or phone becomes inactive;

means responsive to the determining means for disconnecting the machine or phone from the telephone line after it has become inactive; and line manager means adapted to be operatively coupled with the means for directing the incoming message for preventing a voice phone connected with the telephone line upstream of the directing means from communicating with the telephone line when the data machine communicates with the line;

the directing means includes control means for generating first, second and third control signals and for applying the control signals to the line manager means; and wherein the line manager means includes means responsive to the first signal for generating at the upstream voice phone in audible tone communicating phone status information to a user of the phone, means responsive to the second control signal for disconnecting the upstream phone from the line when the data machine is connected with the line, and means responsive to the third control signal for connecting the upstream phone with the line.

12. A method for automatically receiving and second over a communication line incoming and outgoing digital data signals or voice signals and, depending on the type of signal, connecting the line to a digital data machine or a voice phone, the method comprising, for incoming signals, the steps of receiving ringing signals; sending an electronically synthesized first speech message; maintaining silence for a predetermined length of time to permit the caller to take the prompted action; substantially continuously monitoring the incoming signals for periodicity; further sending an electronically generated second voice message to the caller prompting the caller to send a spoken message; and electronically analyzing said incoming signals for a response signal; and, directing said incoming signals to the digital data machine when periodicity in the incoming signals is detected or to the voice phone if they are voice signals; and, for outgoing signals, the steps of monitoring when either the phone or digital data machine becomes active; connecting the active one to the communication line; and monitoring when the active one becomes inactive.

13. A method according to claim 12 wherein the step of sending an electronically generated first voice message comprises the steps of storing compressed digital time domain speech information signals and digital speech reconstruction signals identifying particular compression techniques applied to associated information signals; expanding the information signals in accordance with the reconstruction signals to produce expanded, digital synthesized speech signals; converting the digital, synthesized speech signals into analog speech signals; and sending the analog speech signals as the message over the communication line to the caller.

14. A method according to claim 12 wherein the step of monitoring comprises the step of detecting off-hook current emitted by the phone and digital data machine.

15. A method according to claim 12 wherein the step of monitoring comprises the step of detecting off-hook line voltages emitted by the phone and by the digital data machine.

16. A method according to claim 12 including the step of analyzing incoming signals following the step of sending said second spoken message; determining the presence of periodicity or of non-periodicity in the incoming signals; and directing the incoming signals to the digital data machine when periodicity in the incoming signals is detected or no incoming signals are received, and directing the incoming signals to the voice phone when non-periodicity in the incoming signals is detected.

17. A method according to claim 16 including the step of generating a ring signal when non-periodicity in the incoming signals has been detected, and sending the ring signal to the voice phone.

18. A switch for use in a two-way communication system over a communication line between a sender and a receiver for receiving, sending and distinguishing between and appropriately handling incoming and outgoing digital data signals and voice signals, the switch being adapted for connection to at least one data machine device for handling the digital data signals and at least two voice phone devices for handling the voice signals, the switch comprising a signal processing unit adapted to be operatively coupled with the line and including means for electronically generating an outgoing voice message and for sending the voice message over the line to the sender, the message requesting the sender to provide a spoken message, means for detecting a response from the sender to the outgoing voice message, and means responsive to the response for directing the response to an appropriate one of the devices; means for sensing when one of the devices is being used to send outgoing signals and means responsive to the sensing means for connecting the one device which is being used with the line so that outgoing signals can b sent; line manager means for preventing the connection to the line of the other device while outgoing signals are being sent; and said line manager means is further adapted to be interposed between the upstream voice phone device and the communication line and operatively coupled with said signal processing unit for appropriately connecting and disconnecting at least one of the voice phone devices which is connected to the line upstream of said signal processing unit, said line manager means including means for connecting the upstream voice phone device with the telephone line when the data machine device is disconnected from the line, and means for disconnecting the upstream voice phone device from the line when the data machine is connected thereto.

19. A switch according to claim 18 including means for generating an audible signal in the vicinity of the upstream phone when the directing means directs the response to the voice phone devices.

20. A switch according to claim 19 wherein the audible signal generating means includes means for alternatively generating a ring signal or a busy tone at the upstream phone device.

* * * * *